United States Patent [19]

Flotow

[11] Patent Number: 4,712,659
[45] Date of Patent: Dec. 15, 1987

[54] ADJUSTABLE CLUTCH BRAKE APPARATUS
[75] Inventor: Richard A. Flotow, Butler, Ind.
[73] Assignee: Dana Corporation, Toledo, Ohio
[21] Appl. No.: 940,324
[22] Filed: Dec. 11, 1986
[51] Int. Cl.$^4$ .............. F16D 67/02; F16D 13/75
[52] U.S. Cl. .............. 192/13 R; 192/18 R; 192/98; 192/111 B
[58] Field of Search .............. 192/12 R, 13 R, 18 R, 192/111 B, 98, 110 R, 70.25

[56] References Cited
U.S. PATENT DOCUMENTS

| 973,187 | 10/1910 | Foss | 192/13 R X |
|---|---|---|---|
| 1,241,060 | 9/1917 | Vincent | 192/13 R |
| 1,396,891 | 11/1921 | Short | 192/18 R |
| 1,424,693 | 8/1922 | Vincent | 192/13 R |
| 1,686,352 | 10/1928 | Sweet | 192/18 R |
| 1,819,385 | 8/1931 | Radford | 192/18 R X |
| 1,822,160 | 9/1931 | Matthews | 192/13 R |
| 1,828,423 | 10/1931 | Loeffler | 192/13 R |
| 2,863,537 | 12/1958 | Root | 192/13 R |
| 3,202,247 | 8/1965 | Schmidt et al. | 192/13 R |
| 3,754,628 | 8/1973 | Hildebrand | 192/111 B |
| 3,942,617 | 3/1976 | Poor | 192/13 R X |
| 4,108,295 | 8/1978 | de Gennes | 192/13 R X |
| 4,109,773 | 8/1978 | Higgerson et al. | 192/98 X |

FOREIGN PATENT DOCUMENTS 254444 7/1926 United Kingdom ............ 192/13 R

Primary Examiner—Leslie Braun
Assistant Examiner—Richard M. Lorence
Attorney, Agent, or Firm—Frank B. McDonald

[57] ABSTRACT

An adjustable clutch brake apparatus is provided in a friction clutch release bearing assembly. An annular adjusting ring accommodates a clutch brake ring via an externally threaded surface which engages an internally threaded surface on the clutch brake ring. The adjusting ring is secured by means of its internal circumference to the outer race of therelease bearing assembly, and is thereby free to rotate about the inner race fixed to a release bearing sleeve. In a preferred form, the adjusting ring and the clutch brake ring are selectively locked together to prevent relative rotation during clutch operation. For this purpose, a lockstrap having an elongated aperature is adapted to accommodate a bolt member engageable with a threaded bore formed in a groove formed in the clutch brake ring. The bolt member passes through the slot and rigidly holds the lockstrap in the groove. The adjusting ring contains a plurality of radially extending slots, any one of which may be selectively secured by one end of the lockstrap.

12 Claims, 3 Drawing Figures

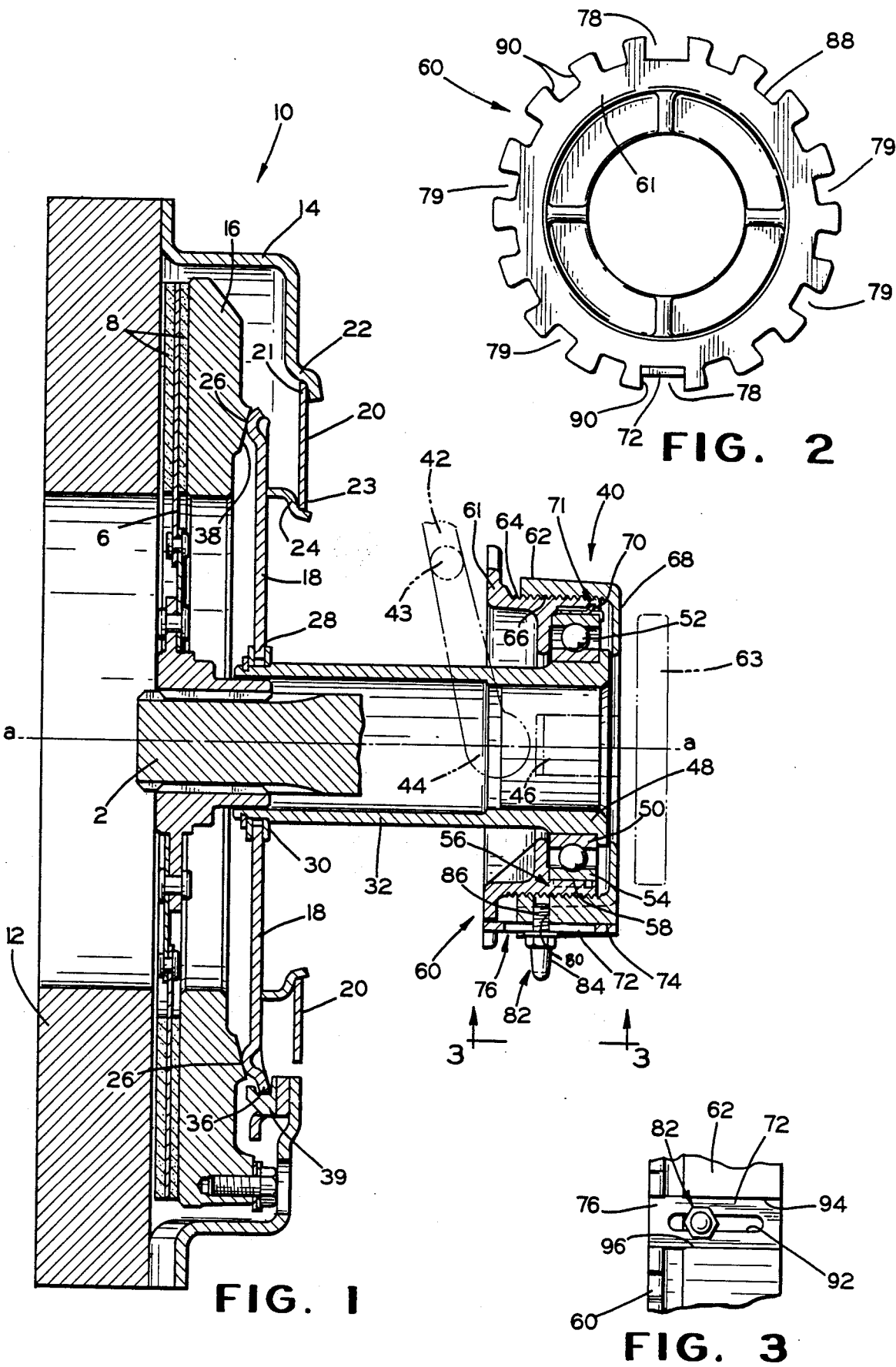

ADJUSTABLE CLUTCH BRAKE APPARATUS

BACKGROUND OF THE INVENTION

This invention relates to apparatus designed to enhance the operation of clutch brakes in friction disc type clutches. More particularly, the invention relates to apparatus for adjustment of a clutch brake ring to provide for continuous clutch brake effectiveness over the useful life of the friction disc clutch linings.

Most of the numerous clutch brake adjustment devices of the prior art require a special skill or instruction to adjust, or are very bulky and expensive to fabricate. Moreover, the devices now available are not readily produced on a mass production scale. Very few are simple to use, and most require an elaborate method of adjustment involving sophisticated techniques by, in most instances, unskilled or untrained personnel.

In many such instances, the elaborate and/or cumbersome steps needed to make such adjustments are often left undone, to the extent that such techniques are burdensome to employ. As a result, many clutch brake systems become useless after the friction clutch linings have become worn to any appreciable extent.

SUMMARY OF THE INVENTION

The adjustable clutch brake apparatus of the present invention provides a means by which adjustment of clutch brakes may be made by an untrained operator using only one hand. Moreover, the clutch brake apparatus of the present invention is simply constructed and inexpensive to manufacture. More particularly, the apparatus is neither cumbersome to install nor difficult to utilize once in place.

In a preferred form, the clutch brake apparatus of the present invention includes a manual adjusting ring adapted for moving a clutch brake ring containing an annular friction surface toward a clutch brake wear pad as the friction linings of an associated clutch friction disc become worn. An adjusting ring is secured to an outer race of a release bearing, and includes an exterior circumferentially threaded portion. The clutch brake ring has an interior circumferentially threaded portion disposed for mating with the exterior threaded portion of the adjusting ring, and is secured directly to the adjusting ring by means of the mating threads. The adjusting ring includes a radially disposed flange portion having a plurality of circumferentially spaced slots which are selectively aligned with a groove in the clutch brake ring. The groove and selected slot are then locked together for securement of an adjustment position by means of a lockstrap. One end of the lockstrap extends into a selected slot, while the other is contained in the brake ring groove by means of a bolt threaded into an aperture which extends radially through the clutch brake ring groove.

In a preferred form, the lockstrap includes an elongated aperture which extends along the longitudinal dimension of the lockstrip accommodating passage of the threaded shaft of the bolt. The lockstrap facilitates simple selection and locking of one of the slots in the adjusting ring by steps of (1) loosening the bolt securing the lockstrap; (2) sliding the lockstrap out of its current slot of the adjusting ring; (3) rotating the adjusting ring to a new slot position; (4) sliding the lockstrap end back toward the adjusting ring to engage a new slot, and (5) retightening the bolt to secure the lockstrap in its new position.

BRIEF DESCRIPTION OF THE DRAWINGS

FIG. 1 is a cross-sectional side view of a friction clutch assembly which includes a preferred embodiment of a clutch brake apparatus as constructed in accordance with the present invention.

FIG. 2 is a face view of an adjusting ring utilized in the preferred construction of FIG. 1.

FIG. 3 is a view along lines 3—3 of FIG. 1.

DETAILED DESCRIPTION OF PREFERRED EMBODIMENTS

Referring initially to FIG. 1, a friction disc clutch assembly 10 is shown in cross-section, and includes a preferred embodiment of an adjustable clutch brake apparatus constructed in accordance with the present invention. The friction disc clutch assembly 10 includes an engine flywheel 12 to which is affixed a clutch cover 14. The flywheel 12 is disposed for selective coupling with an input shaft 2 (shown fragmentarily), to which is splined a friction disc 6 containing clutch linings 8, as shown. A pressure plate 16 is interposed between the flywheel 12 and cover 14, and is secured to the cover loosely so as to accommodate axial but nonrotatable movement with respect to the cover. The pressure plate urges the clutch linings 8 of the disc 6 into engagement with the flywheel 12. A plurality of clutch levers 18 are utilized to hold the clutch in a normally engaged position, which results in the pressure plate 16 being held against the lining 8 by means of a Belleville spring 20. For this purpose, the spring 20 has an outer circumference 21 which is in constant contact with a plurality of cover detents 22 in the cover 14. The inner circumference 23 of the spring 20 is in constant engagement with a collector ring 24 which in turn bears against the clutch levers 18 to transmit the force of the spring 20 to the pressure plate 16 for normal friction disc engagement.

At the outer extremity of each lever is a pressure plate contact point 26 which is effective to bear against the pressure plate 16 on an annular pressure plate lever contact surface 38. The inner extremities 28 of the levers 18 are pivotally secured to a lever engagement connection 30 on a release bearing sleeve 32. The outer extremities 36 of the levers 18 are positioned for pivotal movement in U-shaped channels 39 secured to the cover 14. Those skilled in the art will appreciate that as the release bearing sleeve 32 is urged rightwardly, so as to move the inner extremities 28 of the levers 18 away from the pressure plate, the spring force of the Belleville spring 20 will be overcome, and the pressure plate contact point 26 of the levers 18 will be pulled away from the pressure plate 16 which will then become disengaged from the friction disc.

Movement of the clutch release bearing sleeve 32 is effected by a release bearing assembly 40 which is moved rightwardly against the force of the Belleville spring 20 by means of a clutch release yoke 42. The yoke 42 pivots about an arm 43 and includes a pair of opposed engagement bosses 44 which make contact with a mating pair of release bearing yoke buttons 46 (only one yoke and one button are shown). The release bearing 40 is positioned at the release bearing end 48 of the sleeve 32, opposite the end containing the pivotal lever engagement connection 30. The release bearing end 48 contains an inner race 50 rigidly secured thereto, about which rotates a plurality of bearing balls 52. An outer race or bearing cage 54 secures the balls for rotation about the inner race 50.

Piloted over and secured to the outer race 54 of the release bearing assembly 40 is an adjusting ring 60 which provides a mechanism by which a clutch brake ring 62 may be axially positioned and adjusted relative to a clutch brake wear pad. An interior annular portion 56 of the adjusting ring 60 is piloted over the outer circumference 58 of the outer race 54. The adjusting ring 60 includes a flange portion 61 by which it is manually rotated, and includes also an external threaded portion 64 which mates with an internal threaded portion 66 of the clutch brake ring 62. As the adjusting ring 60 is rotated relative to the clutch brake ring, an annular friction surface 68 disposed for engaging a clutch brake wear pad 63 (shown in phantom) is adjusted axially toward the wear pad (rightwardly, as shown) to compensate for wear of clutch friction linings which are contained on the friction disc, as mentioned earlier.

As noted, rotation of the adjusting ring 60 will, by virtue of the threaded connections between them, cause the clutch brake ring 62 to shift axially relative to the adjusting ring. It will be noted that any manual adjustment of the adjusting ring will be made during the time that the clutch is engaged, hence the force between the release bearing yoke buttons 46 and the engagement end 44 of the clutch release yoke will be such as to hold the clutch brake ring 62 against rotation. Hence, rotation of the adjusting ring 60 will translate into pure axial movement, only, of the clutch brake ring in the direction of the clutch brake wear pad. (An arrow can be used to show preferred direction of rotation of the adjusting ring.)

Those skilled in the art will appreciate that the release bearing structure of the present invention permits adjustment without the need for clutch disengagement, providing a unique advantage for a pull-type clutch (as described). It will further be appreciated that the adjusting ring is axially fixed to the outer race 54 which of course is secured to the sleeve 32. Whenever the clutch is engaged, the sleeve will be held axially fixed by virtue of the levers 18. Hence, rotation of the adjusting ring will translate into pure rotational movement, which because of the mating threads will axially shift the brake ring, held against rotation as described earlier.

This preferred embodiment of the clutch release bearing assembly 40, as depicted, includes another feature which assures an automatic centering or self-aligning of the annular friction surface 68 with respect to the clutch brake wear pad. Thus, for this purpose, a preload and self-aligning spring 70 is positioned between the outer race 54 and the interior annular portion 56 of the adjusting ring 60. In a preferred form, the spring 70 is of a generally L-shaped cross-section, having its longer leg in contact with the outside diameter of the outer race, and its shorter leg extending radially into a groove 71 in the interior annular portion 56 of the adjusting ring. To the extent that the spring provides a preload feature with respect to the outer race and adjusting ring, any tolerance between the latter members is absorbed by the spring during the periods when the clutch brake ring is not in contact with the clutch brake wear pad. Hence, aside from the self-alignment feature, there is very little vibration noise associated with this spring-loaded arrangement. The spring also secures the outer race against relative rotation with respect to the adjusting ring.

Also in the preferred form of the present invention, a lockstrap 72 is employed for the purpose of securing a chosen or selected relative position between the adjusting ring 60 and the clutch brake ring 62. Thus, the clutch brake ring 62 includes a groove 74 which provides a means for securing the lockstrap relative to the clutch brake ring 62. The adjusting ring 60 includes two slots 78 (FIG. 2), 180 degrees apart, either one of which may be engaged by a slot engaging end 76 of the lockstrap 72 (FIG. 3) for securement of a particular adjustment position between the adjusting ring 60 and clutch brake ring 62. A plurality of adjustment notches 79 are employed for the purpose of engagement by a tool for rotation of the ring 60. In the embodiment described, one-half turn, or one hundred eighty degrees of rotation will cause an incremental axial shift of one-sixteenth of an inch.

The clutch brake ring 62 contains a threaded aperture 80 (FIG. 1) which extends through and perpendicularly to the groove 74, and provides a means for retention of a bolt 82 for the purpose of securing the lockstrap 72 in the groove 74. Hence, a coned-shaped bolt head 84 engages the lockstrap 72. The bolt shank 86 is coupled to the head 84, and the shank 86 extends through an elongated slot 92 in the lockstrap 72. As may be seen in reference to FIGS. 1 and 2, the bottom 88 of any individual slot 78 of the adjusting ring has a radius as measured from the center line "a—a" of the sleeve 32 which causes that bottom 88 to register with the surface of the groove 74 to provide for proper securement of the lockstrap. The sides 90 (FIG. 2) of each slot 78 are spaced apart by a dimension substantially equal to the lateral dimension of the lockstrap, as are the spaced side walls 94 and 96 of the groove 74.

In the as-described preferred form, the axial dimension of the elongated slot or aperture 92 will be such that the bolt 82 may be loosened for adjustment without having to be removed, and wherein the slot engaging end 76 of the lockstrap may be axially shifted fully into the groove 74 of the clutch brake ring 62, for disengagement from any presently selected slot. At this point, the adjusting ring 60 will be rotated so as to reposition the annular fraction surface 68 to a new preselected axial location. The slot engaging end 66 of the lockstrap 72 will then be moved out of the groove 74 to engage a new slot 78, whereupon the bolt 82 may be retightened to secure the new relative position between the adjusting ring 60 and clutch brake ring 62. For convenience, the head 84 of the bolt 82 may be used as a pry for rotating the slotted adjusting ring. This may be accomplished very simply with one hand, by means of a screwdriver.

Although only one preferred embodiment has been detailed and described herein, the following claims envision a number of other alternatives which may fall within the spirit and scope thereof.

What is claimed is:

1. In a friction disc clutch assembly including friction linings, said clutch assembly having actuating means disposed for selectively coupling an input shaft and an engine fly wheel, said assembly including a clutch release bearing comprising means for disengagement of said clutch assembly, said release bearing comprising inner and outer races mounted upon and secured to an axially moveable sleeve engagable with said actuating means, said release bearing further comprising a clutch brake ring disposed for engagement with a clutch brake wear pad spaced axially thereof for arresting rotational movement of said input shaft upon disengagement of said clutch assembly; an improvement comprising a manual adjusting ring adapted for moving said clutch brake ring toward said wear pad as said friction linings become worn, said adjusting ring being secured directly to the outer race of said release bearing, and having an exterior circumferentially threaded portion thereon, said clutch brake ring having an interior circumferentially threaded portion disposed for mating with said exterior threaded portion of said adjusting ring, said clutch brake ring being secured directly to said adjusting ring via said mating threads, said adjusting ring comprising means for rotating said adjusting ring, whereby said clutch brake ring may be axially adjusted by said rotation of said adjusting ring.

2. The friction disc clutch assembly of claim 1 wherein said means for rotating said adjusting ring comprises an annular flange having a plurality of circumferentially spaced notches, said flange further comprising a plurality of slots, wherein the positions of said slots relative said clutch brake ring may be changed by rotation of said flange.

3. The clutch assembly of claim 2 further comprising means for locking a selected one of said slots in said adjusting ring with said clutch brake ring.

4. The clutch assembly of claim 3 wherein said clutch brake ring further comprises a groove disposed for alignment with any one of said slots in said flange.

5. The clutch assembly of claim 4 wherein said means for locking further comprises a lockstrap positioned in said groove and engaging one of said slots, whereby said lockstrap secures said adjusting ring against relative movement with respect to said clutch brake ring.

6. The clutch assembly of claim 5 wherein said groove comprises a threaded aperture disposed perpendicularly to said lockstrap and said groove.

7. The clutch assembly of claim 6 wherein said means for locking further comprises a bolt having a threaded shaft for securement in said threaded aperture, and a head on said bolt disposed for rigid engagement with said lockstrap for securement of said lockstrap within said groove.

8. The clutch assembly of claim 7 wherein said lockstrap comprises an elongated aperture extending medially therein for passage of said threaded shaft, said elongated aperture having a length extending parallel to said groove, and disposed for accomodating a sliding movement of said lockstrap whenever said bolt is loosened with respect to said lockstrap.

9. The clutch assembly of claim 8 wherein said groove of said clutch brake ring and said slots of said adjusting ring have extremities defined by sides and bottoms respectively, wherein said respective sides are spaced apart substantially equivalent distances, the width of said slots and said groove being substantially equal to the width of said lockstrap.

10. The clutch assembly of claim 9 wherein said bottoms of said groove and slots are of substantially equal radial distances from the axial centerline of said sleeve.

11. The clutch assembly of claim 10 further comprising means for self-aligning said clutch brake ring with respect to said outer race, said means comprising an annular preload, self-aligning spring positioned between said outer race and said adjusting ring, said spring comprising a generally L-shaped cross-section, wherein a longer leg is in contact with said outer race, said shorter leg in engagement with a groove in said adjusting ring.

12. A release bearing comprising inner and outer races mounted upon and secured to an axially moveable sleeve engagable with a clutch actuating means, said release bearing further comprising a clutch brake ring disposed for engagement with a clutch brake wear pad spaced axially thereof; an improvement comprising a manual adjusting ring adapted for moving said clutch brake ring toward said wear pad, said adjusting ring being secured directly to the outer race of said release bearing, and having an exterior circumferentially threaded portion thereon, said clutch brake ring having an interior circumferentially threaded portion disposed for mating with said exterior threaded portion of said adjusting ring, said clutch brake ring being secured directly to said adjusting ring via said mating threads, said adjusting ring comprising means for rotating said adjusting ring, whereby said clutch brake ring may be axially adjusted by said rotation of said adjusting ring.

* * * * *